April 30, 1963 G. E. FERGUSON ET AL 3,087,444
SEED PLANTER
Filed April 29, 1960 3 Sheets-Sheet 1

Glen E. Ferguson
Roy D. Feusner
Theodore S. Lang
INVENTORS

BY Clarence A. O'Brien
and Harvey B. Jacobson
Attorneys

Glen E. Ferguson
Roy D. Feusner
Theodore S. Lang
INVENTORS

April 30, 1963  G. E. FERGUSON ET AL  3,087,444
SEED PLANTER
Filed April 29, 1960  3 Sheets-Sheet 3
Fig.4
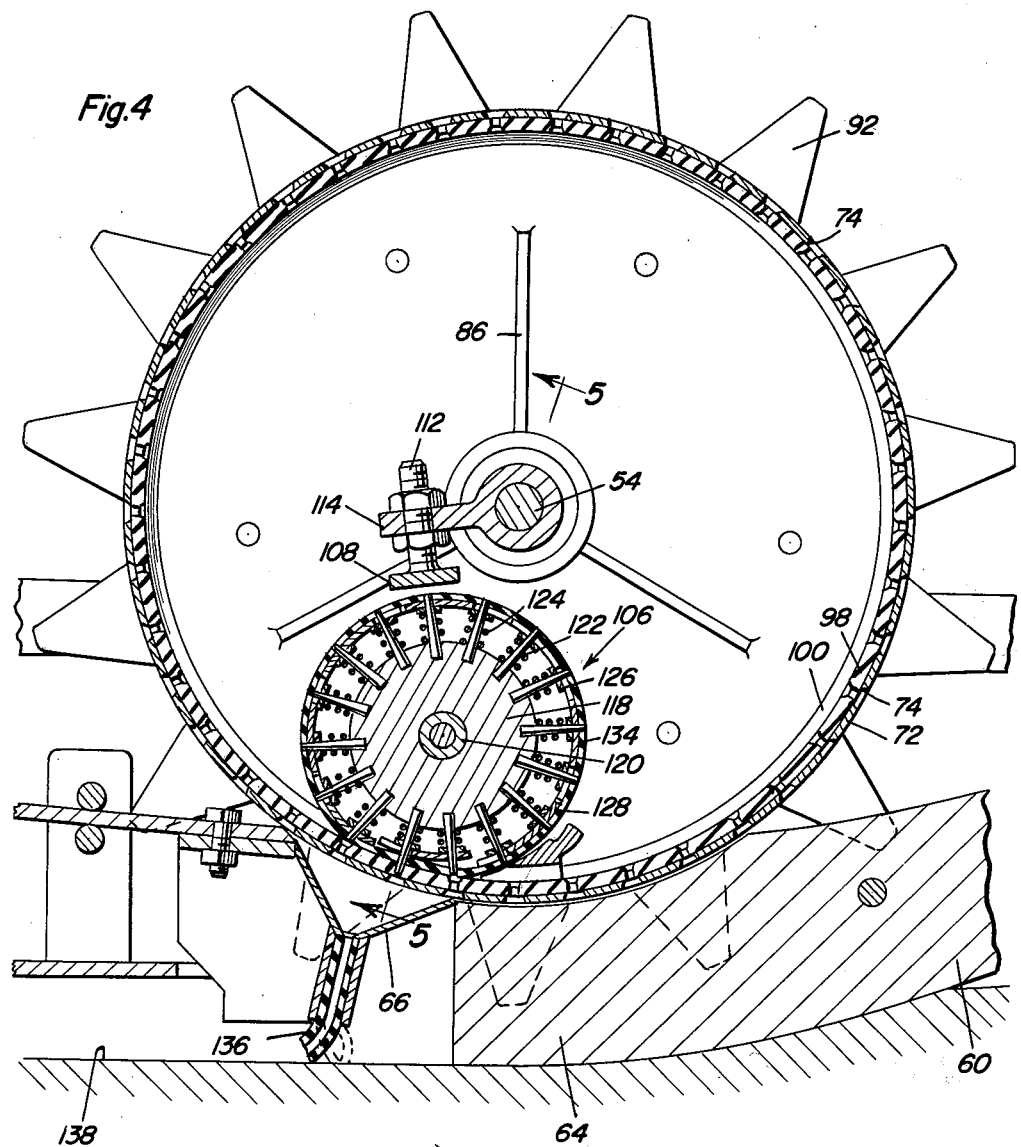
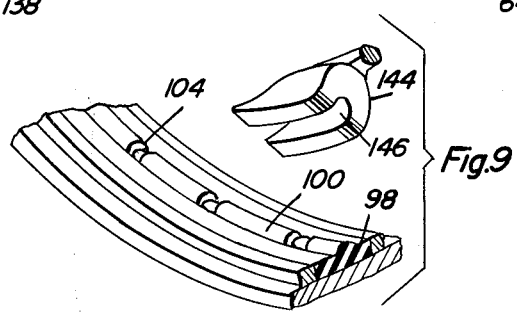
Fig.9
Glen E. Ferguson
Roy D. Feusner
Theodore S. Lang
INVENTORS United States Patent Office 3,087,444
Patented Apr. 30, 1963

1

3,087,444
SEED PLANTER
Glen E. Ferguson, Cowley, Wyo., and Roy D. Feusner, 624 Montana Ave., and Theodore S. Lang, both of Lovell, Wyo.
Filed Apr. 29, 1960, Ser. No. 25,664
11 Claims. (Cl. 111—74)

This invention relates to an agricultural implement for planting of seeds in a shallow furrow.

It is therefore a primary object of this invention to provide an agricultural implement for the planting of seed pellets of various sizes a predetermined distance apart for the growing of such crops as sugar beets, lettuce, onions, etc.

It is a further object of this invention in accordance with the foregoing object, to provide a precision seed planter through which seed may be planted a desired distance apart to thereby eliminate the necessity of thinning plant growth.

Another object of this invention in accordance with the foregoing objects, is to provide a precision seed planter through which one seed at a time is deposited in a shallow furrow predetermined distances apart, in order to avoid the labor involved in thinning the growth of crops.

In accordance with the foregoing objects, the seed planter in accordance with this invention consists of a frame connected at one end to a tractor and at its other end supported by a wheel, said frame rotatably mounting intermediate the ends thereof, a drum to which sprocket teeth are attached for engagement with the ground so that said drum is rotated on the frame as the frame is moved along, with the drum containing the seeds therein which are forced out of apertures located on an annular rim in the center of the drum, said apertures being spaced apart an equal distance so that as each aperture passes a point near the bottom of the frame a seed is forced out thereof and is deposited in a furrow made by a tool connected to the frame forwardly of the drum. Mounted on the frame and disposed within the drum is a seeding wheel mechanism coacting with the annular apertured rim of the drum to force one seed pellet at a time out of the aperture as it is rotated by the drum past the predetermined point hereinbefore referred to. A funnel and flexible tube mounted in the frame directs the seed from the aperture into the furrow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front view of the seed planter.

FIGURE 4 is a sectional view taken through a plane indicated by section line 4—4 in FIGURE 2.

FIGURE 6 is a side elevational view of the seeding wheel mounted within the seed containing drum of the seed planter.

FIGURE 7 is a top view of a portion of the seed planter frame showing the funnel into which the seeds are deposited from the drum.

FIGURE 9 is a partial perspective view of the disassembled parts shown in FIGURE 8.

2

Figure 10:
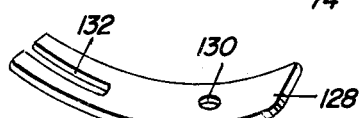
Figure 8:
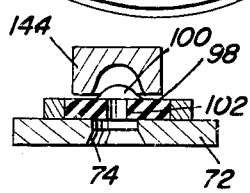
FIGURE 8 is a sectional view of the apertured annular rim of the seed containing drum and shoe member cooperating therewith.

FIGURE 10 is a perspective view of one of the parts of the seeding wheel.

Figure 5:
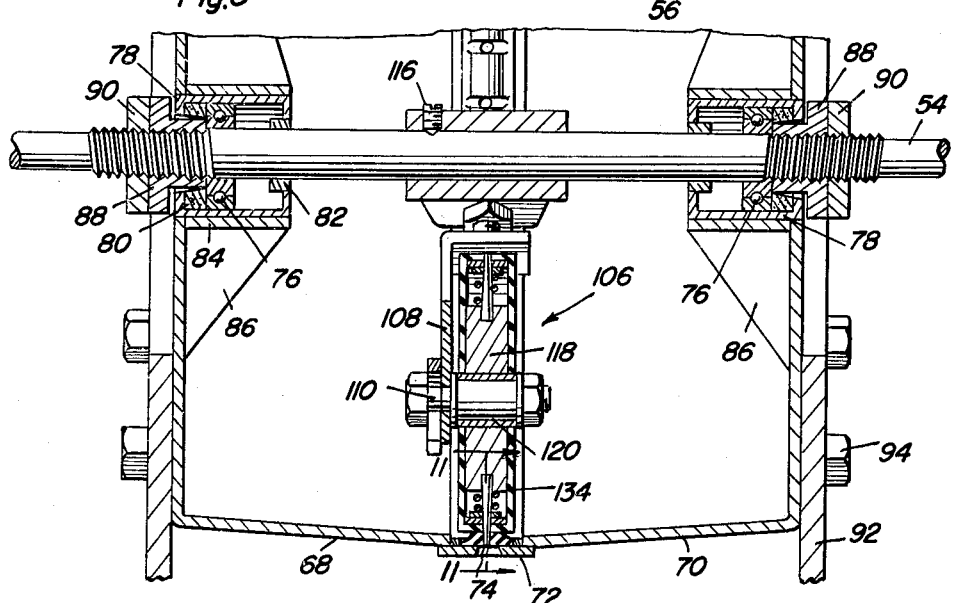
FIGURE 5 is a partial sectional view taken through a plane indicated by section line 5—5 in FIGURE 4.

FIGURE 11 is an enlarged partial sectional view taken substantially through a plane indicated by section line 11—11 in FIGURE 5.

Figure 1:
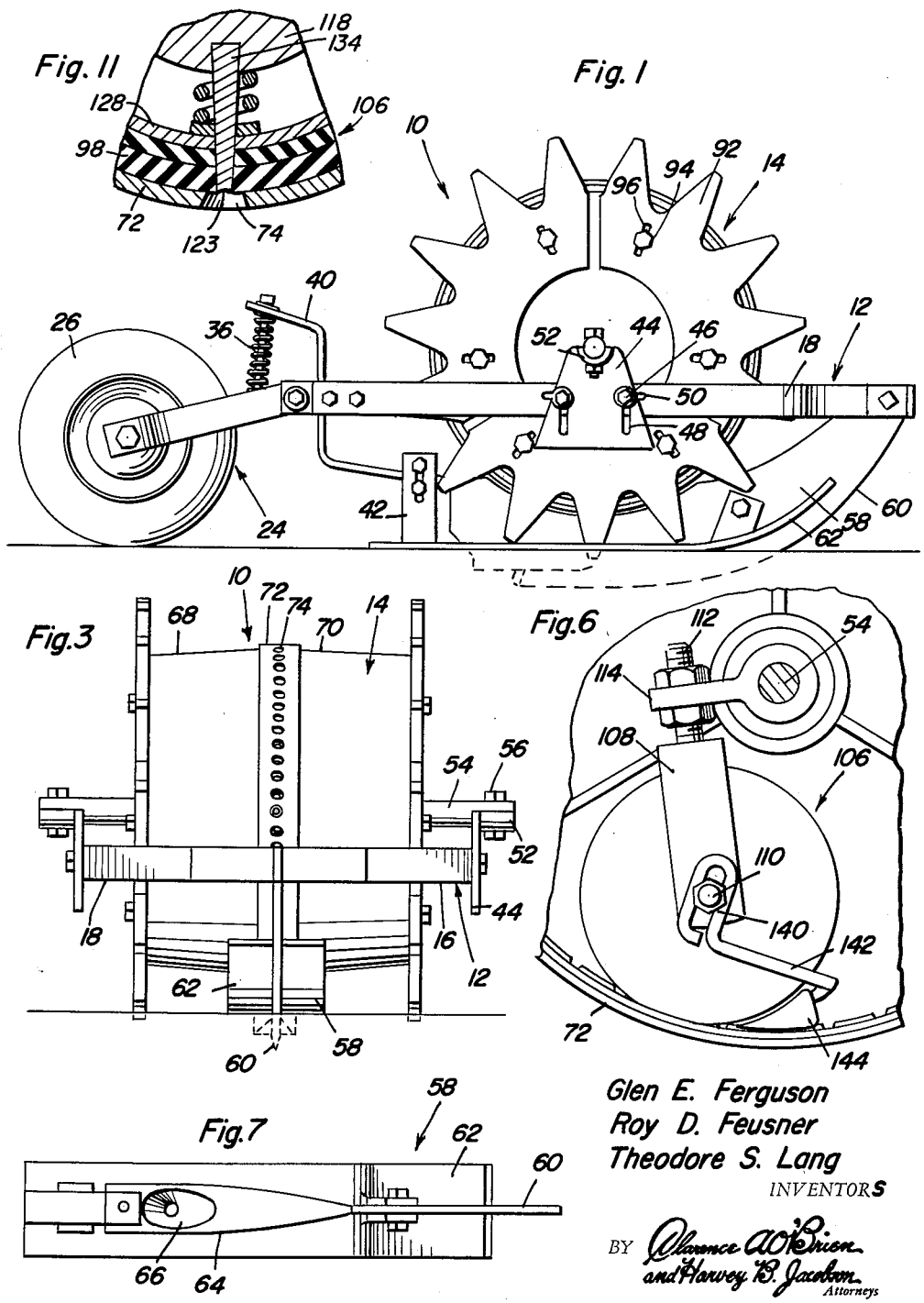
FIGURE 1 is a side elevational view of the seed planter in accordance with this invention.
Figure 2:
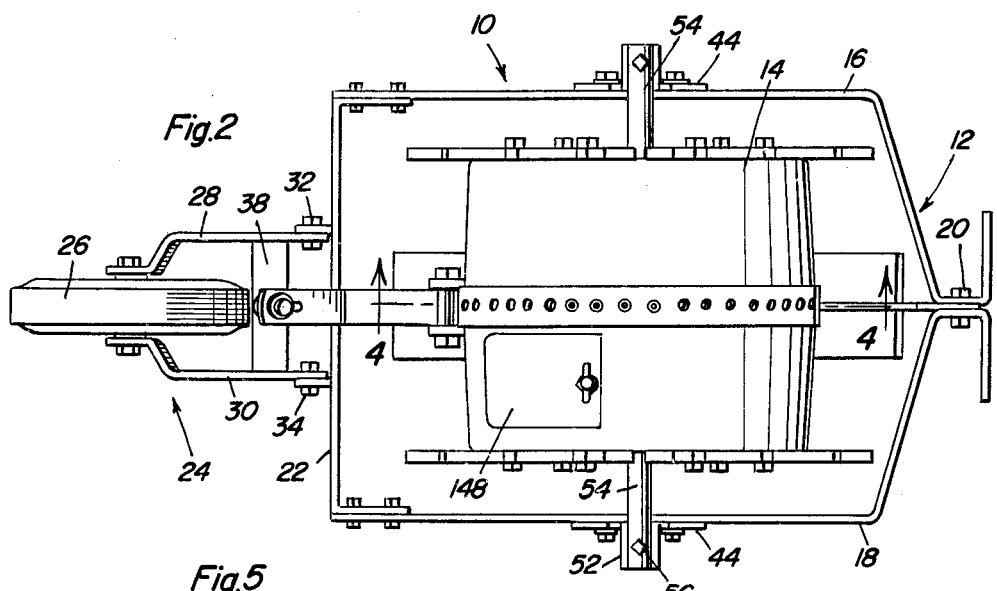
FIGURE 2 is a top view of the seed planter in accordance with this invention.

Referring to the drawing in detail, reference numeral 10 generally indicates the seed planter in accordance with this invention. As shown in FIGURES 1, 2 and 3, the seed planter 10 includes a frame generally indicated by reference numeral 12 on which there is rotatably mounted the seed storing drum 14.

The frame 12 includes side members 16 and 18 bolted together at a forward end by means of bolts 20 at which forward end the seed planter may be connected to a tractor. The side frame members 16 and 18 are interconnected at a rear end thereof by means of frame member 22 to which a rear wheel assembly generally indicated by reference numeral 24 is connected. The rear wheel assembly 24 includes a wheel 26 supported between members 28 and 30 which are pivoted to the rear frame member 22 by means of bolts 32 and 34 and biased downwardly by means of spring 36 reacting between a cross member 38 for connecting the members 28 and 30 and a member 40 connected to the frame 12 by means of bracket 42.

Adjustable supporting brackets 44 are mounted in an adjustable manner to the side frame members 16 and 18 by means of bolts 46 passing through perpendicular slots 48 and 50 in the brackets 44 and side frame members respectively. Fixed to a seat portion 52 of the bracket 44 is a shaft member 54 connected by means of bolts 56 to the brackets 44. The drum 14 is thereby rotatably mounted on the frame 12.

A frame body member generally indicated by reference numeral 58 is connected to the frame 12 at a forward end by means of the bolts 20 and yieldably connected at its other end by means of bracket 42, member 40 and yieldable connection 36 to the rear wheel assembly 24. The body member 58 includes a knife edge portion 60 at its forward end for cutting a shallow furrow in the ground and has lateral flanges 62 connected thereto which are flush with the top surface of the ground as more clearly seen in FIGURE 1. The knife edge portion 60 of the body 58 diverges into a wider portion 64 as more clearly seen in FIGURE 7 said portion 64 having mounted therein a funnel 66 which underlies the bottom of the drum as more clearly seen in FIGURE 4.

Referring to FIGURES 2, 3, 5 and 4, it will be seen that drum 14 consists of two halves 68 and 70 interconnected by an annular rim 72 having a plurality of apertures 74 therein. As more clearly seen in FIGURE 5, the drum halves are rotatably mounted on the shaft 54 fixed to the frame by means of bearings 76 seated on the shaft 54 and sealed within bushings 78 by means of seals 80 and 82. Integral with the drum half 68 for example is a sleeve portion 84 within which the sealed bushing and bearing assembly is seated for rotatably supporting the drum, said sleeve portion 84 being rigidly supported from the end wall of the drum by means of ribs 86. A thrust member 88 is threadedly secured to the shaft 54 and bears against the bearing 76 to maintain the drum and bearing assembly in assembled position on the shaft 54. Lock nuts 90 are provided for holding the thrust member 88 in assembled position. As more clearly seen in FIGURE 1 each axial end of the drum has connected thereto sprocket teeth members 92 which are adjustably connected to the sides of the drum by means of screw and slots 94 and 96 respectively. As shown in FIGURE 1, three segmental sprocket members 92 are employed, and are so arranged on the ends of the drum so as to engage the ground as the frame is moved along to thereby cause the drum to rotate relative to the shaft mounting 54 fixed to the frame.

As more clearly seen in FIGURES 4, 5, 8 and 9, the annular apertured rim 72 of the drum has connected thereto an annular inner ring of flexible material 98, said ring 98 having a centrally disposed rib 100 through which the seed retaining apertures 102 in the ring 98 extend. As more clearly seen in FIGURE 9, the rib 100 forms a pocket 104 of larger dimensions than a seed pellet in communication with the seed retaining aperture 102 necessarily of smaller dimension than the seed pellet, said pocket 104 being of such dimension as to accommodate a single seed, a seed accordingly becoming seated in the pocket 104 requiring mechanism to push it through the smaller apertures 102 from which it may freely pass through the larger aperture 74 in the annular rim 72. Thus, the rib 100 in addition to imparting sufficient stiffness to the ring 98, for proper driving engagement with a friction seeding wheel, also aligns seed pellets with the apertures 102 for ejection therethrough and cooperates with a seed diverting shoe element as will be explained hereafter.

The mechanism for pushing the seed pellet becoming lodged in the pocket 104, through the apertures 102 of the ring 98 is a seeding wheel generally indicated by reference numeral 106. As more clearly seen in FIGURES 5 and 6, the seeding wheel is rotatably mounted on a bracket member 108 by means of bolt 110 passing therethrough, said bracket being adjustably connected to the frame supporting shaft 54 by means of adjustable screw 112 being secured to an arm 114 fixed to the shaft 54 by any suitable means such as setscrew 116 as seen in FIGURE 5. The seeding wheel 106 includes a hub member 118 rotatably journaled on the bolt 110 by means of sleeve 120, said hub member 118 including a plurality of radial equidistant spaced spokes 122 being tapered to an outer radial end 123 which is cup-shaped as seen in FIGURE 11 so as to receive or engage a seed pellet and push it through the apertures 102 in the annular ring 98 as the spoke is rotated into engagement with the annular ring as more clearly seen in FIGURE 4. Each seed ejecting spoke 122 has a coil spring 124 seated thereon reacting between the hub member 118 and a washer 126 which biases outwardly a curved plate rim segment member 128 as more clearly seen in FIGURE 10, said curved plate 128 including an aperture 130 for receiving one spoke to accommodate radial displacement of the plate 128 with respect to said one spoke projecting therethrough and a slot 132 through which the adjacent spoke extends to accommodate both radial and lateral displacement of the plate with respect to said adjacent spoke. The curved plates 128 form thereby a yieldable outer rim for the wheel 106 that is circular for driving engagement with the annular rim 72. The plates are enclosed by a yieldable covering 134 which prevents the seed from entering the wheel and to normally provide a continuous frictional engaging surface covering said spokes so as to avoid unintentional displacement of an approaching seed pellet from a pocket 104 by the spokes before ejection of the seed. It will therefore be apparent that the seeding wheel rim will be segmentally deformed only during driving engagement with the drum to expose the ends of the seed ejecting spokes 122 for projection into the seed retaining apertures. This is made possible because of the arrangement of the curved plates in forming the segmentally deformable circular rim.

As more clearly seen in FIGURE 4, the funnel 66 is mounted within the body portion 64 and is disposed beneath the drum where it contacts the seeding wheel 106 so as to receive a seed punched out of the ring 98 and through the apertures 74 in the annular rim 72. A flexible tube 136 is connected to the bottom of the funnel 66 through which the seed falls into the furrow 138 formed by the knife edge 60. As shown in FIGURE 4, the tubular member 136 is inclined rearwardly and yieldably engages the bottom of the furrow 138 and flexed thereby upon forward movement of the frame and furrow making tool 60. However, upon rearward movement of the frame the end of the flexible tube 136 will be biased in the opposite direction as shown in dotted lines in FIGURE 4 to thereby close the end of the tube as shown in dotted line and prevent any dirt from entering the tube or seed from leaving the tube.

Referring now to FIGURES 4, 6, 8 and 9, a supporting bracket member 140 is adjustably connected to the axle 110 of the seeding wheel 106 as shown in FIGURE 6, said bracket 140 having an arm 142 extending therefrom to which a seed diverting shoe member 144 is connected. As more clearly seen in FIGURES 4, 8 and 9, the shoe member 144 is guidingly engaged with the rib 100 on the annular ring 98 and is positioned between approaching portions of the seeding wheel rim and the drum ring 98 to restrict relative movement to the passage of the rib with a single seed pellet in each pocket 104 through the shoe groove 146 as shown in FIGURE 4. As a result thereof, the shoe member 144 prevents any other seeds from becoming wedged between the seeding wheel 106 and the annular ring 98 to avoid disturbance of the frictional drive and insure that only the single seed seated in the pocket 104 of the rib portion 100 of the annular ring 98 will be punched out of the aperture 102 in the ring 98 by a spoke 122.

From the foregoing description, operation of the seed planter will be apparent. Summarizing however the operation, it will be observed that the seed may be loaded into the drum by means of a door 148 as seen in FIGURE 2. As the frame 12 is drawn along by the tractor, the tool 60 will make a furrow 138 as seen in FIGURE 4 into which the seeds are deposited. It will be obvious that a seed will become lodged in each of the pockets 104 of the annular rib 100 near the bottom of the drum as it is rotating. As the seed and pocket 104 approaches a point wherein it becomes engaged with the seeding wheel 106 the shoe member 104 covering the rib 100 by means of its groove 146 and on either side of the rib 100 by means of the bottom of the shoe, prevents the entry of any seed between the annular rim of the seeding wheel 106 and the ring 98 in the area of engagement therebetween so that as a spoke 122 engages the ring 98 yieldably biasing the rim inwardly against the bias of spring 124, the cup-shaped end of the spoke 122 will push the seed through aperture 102 into aperture 74 of the annular rim 72 from which point it will be received by funnel 106 and then fall out of the funnel through tube 136 onto the bottom of the furrow 138. Accordingly, one seed at a time will be deposited in the furrow 138 and spaced apart a distance depending on the spacing between the spokes on the seeding wheel 106 which equal the spacing between the apertures in the annular rim 72. Accordingly, by changing the spacing of the spokes on the seeding wheel and the spacing of the apertures in the annular rim of the drum, a different seed spacing may be obtained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A seed planter comprising, frame means, seed storing traction means rotatably mounted on said frame means and having an annular rim with seed retaining apertures, furrow forming means terminating under the seed storing traction means independently thereof and operatively connected to the frame means to form a furrow below said seed storing traction means, a dispenser wheel rotatably mounted by said frame means within the seed storing traction means having a plurality of radially fixed seed ejecting spokes and segmentally deformable rim means frictionally engageable with said annular rim of the seed storing traction means to deform the same, and including openings for sequentially exposing each spoke through the deformable rim means for projecting one seed pellet through one of said seed retaining apertures in response to rotation of the seed storing traction means, and seed depositing means mounted on the frame means and disposed below said seed storing means within the furrow formed by the furrow forming means for conducting said one seed pellet ejected from the annular rim of the seed storing means into the furrow in response to forward movement only of the frame means.

2. In a seed planter the combination of a seed storing drum assembly rotatable about a rotational axis, a seed ejecting wheel assembly rotatable within said drum assembly about a wheel axis fixedly spaced from said rotational axis and means for rotating the seed storing drum assembly; said drum assembly including an annular flexible rim having a radially outer portion with circumferentially spaced seed retaining apertures through which seeds are ejected and a radially inner rib portion having a plurality of circumferentially spaced seed receiving pockets communicating with said apertures; said seed ejecting wheel assembly including a hub mounted for rotation about said wheel axis, a plurality of seed ejecting spokes fixedly mounted on said hub and elastic rim means yieldably mounted on said spokes for frictional driving engagement with said annular flexible rim and having a continuous outer friction surface with openings therein and segmentally deformable during driving engagement to expose said ejecting spokes through said openings for projection into said apertures, and a seed diverting shoe fixedly mounted within said drum assembly between approaching portions of said annular flexible rim and said elastic rim means in the direction of rotation of the drum assembly and the ejecting wheel assembly, said shoe having a groove structurally related to said flexible rim for receiving said rib portion therethrough.

3. In a seed planter, a seed dispensing mechanism comprising, seed storing means rotatably mounted about a rotational axis retaining seed pellets therein, means for rotating the seed storing means, apertured frictional drive means mounted on said seed storing means having internally spaced seed retaining pockets therein, rigid seed ejecting wheel means rotatably mounted about a wheel axis fixedly spaced from said rotational axis within the seed storing means for sequential projection of seed pellets in said pockets through said frictional drive means in response to relative movement of the seed ejecting wheel means, segmentally deformable rim means mounted on the seed ejecting wheel means in enclosing relation thereto for relative movement thereof by frictional engagement with the frictional drive means causing segmental deformation of the deformable rim means during driving engagement, said deformable rim means having openings, to expose the rigid seed ejecting wheel means in response to deformation for sequential ejection of seed pellets, and seed diverting means mounted in fixed relation between said frictional drive means and deformable rim means within the seed storing means and structurally related to the frictional drive means for restricting said relative movement to passage of a single seed pellet in each pocket on the frictional drive means into engagement with the deformable rim means.

4. The planter as defined in claim 1, wherein said seed depositing means comprises a funnel and tubular means connected to said funnel and operative to deposit a seed from one end thereof.

5. The planter as defined in claim 4 wherein said tubular means comprises a flexible tube inclined rearwardly from a vertical direction and yieldably engageable at one end with a bottom of the furrow, so that rearward movement of said frame means would cause closing of said one end.

6. The planter as defined in claim 5, further including guide means connected to said frame means and disposed between said segmentally deformable rim means and annular rim of the seed storing traction means for preventing the dispensing of more than one seed at a time.

7. The planter as defined in claim 6, wherein said guide means comprises a shoe having a groove therein which guidingly engages an annular rib formed on said annular rim, said apertures in said annular rim communicating with circumferentially spaced pockets formed in the annular rib for receiving one seed.

8. The planter as defined in claim 1, including guide means comprising a shoe having a groove therein which engages an annular rib on said annular rim for diverting seeds away from the rib and dispenser wheel, said rib having a plurality of circumferentially spaced seed containing pockets formed therein in communication with said seed retaining apertures.

9. A seeding wheel for a seed planter having movable means with which said seeding wheel is adapted to be engaged, comprising a rotatably mounted wheel hub, a plurality of radial tapered spokes fixedly mounted in said hub, said spokes having cup-shaped ends for receiving one seed, a plurality of curved plates having an aperture through which one spoke extends and a slot through which a second adjacent spoke extends, spring means disposed about each spoke biasing said curved plates outwardly into positions forming a circular rim and a flexible covering having openings therein enclosing said circular rim for segmental deformation therewith to expose said cup-shaped spoke ends through said openings.

10. In a seeding drum for a seed planter having seed ejecting means and a seed diverting element operatively disposed with respect thereto; an annular flexible rim through which seeds are adapted to be punched by said seed ejecting means, said rim including a radially outer surface having a plurality of circumferentially spaced seed restrictive apertures therein, and a radially inner surface having a radially inwardly projecting rib adapted to cooperate with said seed diverting element disposed between the rib and the seed ejecting means for diverting seeds away from the rib and seed ejecting means, a plurality of seed receiving pockets formed in said rib, each seed receiving pocket being in communication with one of said apertures for aligning one seed received therein with said one of the apertures.

11. The rim as defined in claim 10, wherein each seed pocket accommodates a portion of a single seed for aligning only one seed with each of said apertures.

References Cited in the file of this patent

UNITED STATES PATENTS

| | | |
|---|---|---|
| 491,510 | Baird | Feb. 14, 1893 |
| 806,260 | Johnston | Dec. 5, 1905 |
| 1,006,984 | Sheetz | Oct. 24, 1911 |
| 2,000,864 | Schaub | May 7, 1935 |
| 2,234,778 | Redwood | Mar. 11, 1941 |
| 2,510,658 | Rassmann | June 6, 1950 |
| 2,533,374 | Hyland | Dec. 12, 1950 |
| 2,543,888 | Bunch | Mar. 6, 1951 |
| 2,854,884 | Clausing | Aug. 5, 1958 |
| 2,615,408 | Hylten | Oct. 28, 1958 |
| 3,022,755 | Roepke | Feb. 27, 1962 |

FOREIGN PATENTS

| | | |
|---|---|---|
| 181,109 | Austria | Feb. 25, 1955 |
| 501,337 | Belgium | Mar. 15, 1951 |
| 889,371 | Germany | Sept. 10, 1953 |